United States Patent [19]

LeVine

[11] Patent Number: 5,082,497
[45] Date of Patent: Jan. 21, 1992

[54] SOLUTION ROSIN RESINATE FOR PUBLICATION GRAVURE INKS

[75] Inventor: Joseph W. LeVine, Panama City, Fla.

[73] Assignee: Westvaco Corporation, New York, N.Y.

[21] Appl. No.: 586,673

[22] Filed: Sep. 24, 1990

[51] Int. Cl.$^5$ .................................................. C09D 11/08
[52] U.S. Cl. ...................... 106/30; 106/20; 106/27; 530/210; 530/205; 530/230
[58] Field of Search .................. 106/30, 32, 232, 234, 106/20, 27

[56] References Cited

U.S. PATENT DOCUMENTS

| | | | |
|---|---|---|---|
| 1,439,696 | 8/1922 | Doughty. | |
| 2,299,135 | 10/1942 | Erickson et al. | 260/30 |
| 2,393,637 | 1/1946 | Jones et al. | 260/14 |
| 3,468,829 | 9/1969 | Yoshioka et al. | 260/27 |
| 4,198,326 | 11/1978 | Rudolphy et al. | 260/24 |
| 4,198,329 | 4/1980 | Rudolphy et al. | 260/24 |
| 4,312,631 | 1/1982 | Cuntze et al. | 8/583 |
| 4,391,640 | 7/1983 | Okoshi et al. | 106/29 |
| 4,398,016 | 8/1983 | Homma et al. | 528/158.5 |

FOREIGN PATENT DOCUMENTS

| | | |
|---|---|---|
| 46-36103 | 10/1971 | Japan. |
| 50-5086 | 2/1975 | Japan. |
| 763418 | 9/1980 | U.S.S.R. . |

OTHER PUBLICATIONS

F. G. Oswald, "Rosin Derivatives for Ink . . . " *American Ink Maker*, Mar. 1945, pp. 25-29 and 47.

*Primary Examiner*—William R. Dixon, Jr.
*Assistant Examiner*—Timothy D. Saunders
*Attorney, Agent, or Firm*—Terry B. McDaniel; Daniel B. Reece, IV; Richard L. Schmalz

[57] ABSTRACT

A gravure printing ink comprising, a vehicle having a binder dissolved in a hydrocarbon solvent and a pigment dispersed therein, wherein the binder is a modified rosin resinate prepared by reacting a rosin modified by reaction with a dienophile to form a rosin adduct, and reacting the rosin adduct with from about 0.1% to about 5.0% by weight of the resinate of a reactive compound of a metal belonging to Group I of the Periodic Table to form a resinate.

39 Claims, No Drawings

SOLUTION ROSIN RESINATE FOR PUBLICATION GRAVURE INKS

BACKGROUND OF THE INVENTION (1) Field of The Invention

This invention relates to gravure printing inks having vehicles containing improved solution rosin resinates. More specifically, this invention relates to improved rosin resinates modified with Group I metals, methods for preparing the modified rosin resinates, as well as use of the modified rosin resinates in vehicles for gravure printing inks.

(2) Description of The Prior Art

A gravure printing ink generally comprises a pigment and a vehicle containing a binder to carry the pigment. There is considerable research to reduce the cost of printing ink binders but in attempting to reduce costs the performance requirements of the ink must be maintained. As the printing arts have developed the speeds of printing have increased and requirements for various ink properties, such as gloss, drying properties, blocking, holdout, film formation, film toughness (resistance to abrasion), reducibility, printability, color development, resistance to static movement or rub, compatibility and stability, are of primary importance to the binder supplier. All of these properties are affected by the binder or resin used to formulate the printing inks.

Rosins have been used as binders in vehicles for printing inks for many years. For example, U.S. Pat. No. 2,299,135 to Erikson, et al.; U.S. Patent No. 2,393,637 to Jones, et al.; and U.S. Pat. No. 4,398,016 each disclose a rosin modified phenolic resin in a vehicle for offset printing inks. The patents to Yoshioha, et al., U.S. Pat. No., 3,468,829 and Rudolphy, et al., U.S. Pat. No. 4,198,329 and the book "Rosin Derivatives For Ink ...," American Ink Maker, F. G. Oswald (1945) each disclose rosin esters used in printing ink formulations.

Historically, among the problems facing a publication gravure ink containing a rosin resinate have been compatibility of the resinate, in particular metal rosin resinates, with cellulosic reinforcing fillers, such as ethyl hydroxy ethyl cellulose (EHEC) solutions and stability of yellow pigment inks. Solutions to these problems have been diametrically opposed. One way to improve EHEC compatibility has been to increase the moisture level in the resinate but yellow pigment is sensitive to moisture and increased moisture levels is detrimental to yellow pigment stability. One way to improve yellow pigment stability is to eliminate the use of zinc in the manufacture of the solution metal resinates which results in loss of EHEC compatibility.

There exists a need in the art of gravure printing inks for an ink which is inexpensive and exhibits high performance characteristics. Also there is need for a gravure printing ink having improved stability with yellow pigment and improved compatibility with ethyl hydroxy ethyl cellulose without diminishing printing quality. Further, there is also a need in the art for more homogeneous printing ink vehicles which exhibits consistent properties.

Accordingly, an object of this invention is to provide gravure printing inks having a vehicle containing rosin resinates improved by being modified with a reactive compound of a metal from Group I of the Periodic Table.

Another object of this invention is to provide a rosin resinate containing a reactive compound of a metal belonging to Group I of the Periodic Table.

A further object of this invention is to provide a process for making modified rosin resinates which are particularly useful as a component of printing ink vehicles.

Other objects, features and advantages of the invention will be apparent from the details of the invention as more fully described and claimed.

SUMMARY OF THE INVENTION

The present invention is a gravure printing ink having a vehicle comprising a binder dissolved in hydrocarbon solvent and a pigment dispersed therein. The binder is a modified rosin resinate prepared by reacting a rosin modified by reaction with a dienophile to form a rosin adduct, and reacting the rosin adduct with a reactive compound of a metal belonging to Group I of the Periodic Table. The rosin adduct is reacted with zinc calcium, or mixtures thereof in a hydrocarbon solvent either along with or after reacting the rosin adduct with the reactive compound of a metal belonging to with the Group I of the Periodic Table.

The metal resinates of this invention preferably have a melting point greater than 160° C. and good dilutability in hydrocarbon solvents. The solution metal resinates generally have the following properties.

Bulk Viscosity 25° C. (Brockfield, Cps): 2000–4000
Color (Gardner): 10–17
% Non-Volatiles: 58.0–62.0
Gardner Viscosity: 25° C.: Z It has been found that the gravure printing ink formulations in accordance with this invention have improved stability with yellow pigment in ink formulations, improved EHEC compatibility and improved color development in red and blue inks.

DETAILED DESCRIPTION OF THE INVENTION

The rosins employed in this invention may be tall oil rosin, gum rosin or wood rosin. Rosin is mainly a mixture of $C_2O$, fused-ring, monocarboxylic acids, typified by levopimaric and abietic acids, both of which are susceptible to numerous chemical transformations.

Tall oil rosin is isolated from crude tall oil obtained by acidulation of the "black liquor soap" skimmed off the concentrated alkaline digestion liquor washed out o paper pulp in the kraft, i.e., sulfate, pulping process for making paper. Fractionation of the crude tall oil yields tall oil rosin and fatty acids. The tall oil rosin use in this invention preferably contains at least 80% rosin acids and most preferably about 95% to 97% rosin acids. It should be understood, however, that the invention contemplates the use of tall oil rosin having rosin contents much lower, for example, about 30% rosin acids. The remaining material is fatty acids and unsaponifiable material.

Gum rosin is produced by the natural separation and gradual conversion of some of the hydrophilic components of sap and related plant fluids from the cambium layer of a tree into increasingly hydrophobic solids. Pine gum contains about 80% gum rosin and about 20% turpentine.

Wood rosin is obtained by resinification of oleoresin from either natural evaporation of oil from an extrudate or slow collection in ducts in sapwood and heartwood. Pine tree stumps are valuable enough to be extracted with hexane o higher-boiling paraffins to yield wood rosin, wood turpentine, and other terpene-related compounds by fractional distillation.

Rosin is charged to a reactor and heated until melted. The reaction can be conducted in a vessel properly equipped with, say, a thermometer, stirrer, and a distillation column to separate water that distills from reactants, and optionally a dean stark trap. The molten rosin is agitated as soon as the melting process makes it possible and agitation is continued throughout the process.

A dienophile is added to the molten rosin and the mixture heated to cause a Diels-Alder (cycloaddition) reaction between the dienophile and the rosin. The preferred dienophiles for reaction with the rosin include fumaric acid, maleic acid, acrylic acid, methacrylic acid, itaconic acid, citraconic acid and maleic anhydride. It is possible to substitute other dienophiles therefor although they are less preferred. The dienophile is preferably used in an amount of from about 0.16 to about 1.0 equivalents per equivalent of rosin and more preferably comprises from about 0.3 to about 0.6 equivalents per equivalent of rosin.

The reaction temperature should be in the range of between the melting point of the rosin and the boiling point of the dienophile. The optimum reaction temperature will be selected depending upon the rosin and the dienophile used, generally about 150° C. to about 250° C., with about 200° to about 210° C. being preferred. Heating is continued until a rosin adduct is produced having an acid value of from about 210 to 220, which usually takes about 1 to 3 hours. The reaction may be carried out under a blanket of inert gas such as nitrogen. The rosin adduct is cooled preferably to from about room temperature to about 100° C. and dissolved in a hydrocarbon solvent to form a solubilized rosin adduct. Any of the hydrocarbon solvents generally used in gravur printing inks are suitable.

The rosin adduct is then reacted with from about 0.% to about 5% by weight of a reactive compound of a metal belonging to Group I of the Periodic Table, preferably from about 0.2% to about 1.0% by weight. The preferred Group I metals are lithium, sodium and potassium. The Group I metal is used in a metal salt form and is normally added to a hydrocarbon solvent and reacted with th solubilized rosin adduct. Typical of the reactive metal compounds are the hydroxides or nitrates. The reaction is heated, normally to reflux temperatures, and the water of reaction maybe removed through azeotropic distillation. The metal resinate is solubilized in a suitable hydrocarbon solvent to form a solution metal resinate.

Optionally, the dienophile-rosin adduct is reacted with a slurry of a reactive zinc compound dissolved in a hydrocarbon solvent along with or after reaction with the Group I metal. Suitable reactive zinc compounds include metallic zinc or oxides or hydroxides of zinc. The reaction temperature depends upon the rosin adduct and the reactive zinc compound, generally at under reflux or at temperatures about 100° C. to 120° C. The reaction can be accelerated using a catalyst, such as, e.g., dibutyltin oxide or butyl stannoic acid. Th desirable amount of the zinc compound based on the adduct is the reaction equivalent or less. Generally, about 2% to about 10% by weight, particularly about 4% to about 7% by weight based on the weight of the rosin adduct o zinc is reacted. It should be understood that calcium hydroxide (lime) may replace part or all of the zinc in this reaction. Hydrocarbon solvents, such as those generally used as vehicles in printing inks may be used to form a solution resinate.

Another aspect of this invention is to utilize the good dilutability characteristics of the modified rosin resinate. A convenient method is to dissolve the resinate into any of the solvents generally used as vehicles in gravure printing inks, such as hydrocarbon solvents, including naptha, toluene, and mixtures thereof such as Lactol Spirits ® from Union Oil Co. resinate which dissolves will vary depending upon the hydrocarbon solvent used and the viscosity desired.

The printing ink compositions formulated in accordance with the present invention are made in the same manner as conventional printing ink compositions except the resinate of the present invention is employed in the ink vehicle. The printing ink compositions, especially gravure printing ink compositions, are generally prepared by dispersing in a mill, pigment, clay, hydrocarbon solvent, resinate, lecithin and other ingredients typically used in printing inks. The pigments used in the printing ink compositions are well-known to those of ordinary skill in the printing art.

A reinforcing filler, such as ethyl cellulose or especially ethyl hydroxy ethyl cellulose, may be added to improve flexibility and abrasion resistance of printed surfaces. The ethyl cellulose is usually mixed with the vehicle in a form of a hydrocarbon solution. Reinforcing filler may be added in amounts up to about 12% by weight, preferably less than about 10% by weight, based on the finished product.

The viscosity of the vehicle can be selected from a wide range depending on the kind of pigment to be mixed and mixing machine, and generally a viscosity more or less 30–150 cps./25° C. is desirable. The concentration of the rosin resinate may be such that the viscosity of the vehicle can be maintained within the above range, a concentration, 30–50 weight percent being widely employed.

The most common mixing ratio of the vehicle, pigment and reinforcing filler is as follows:

|  | Desirable Extent | Optimum Extent |
| --- | --- | --- |
| Vehicle (wt. parts) | 60–97 | 80–90 |
| Pigment (wt. parts) | 3–40 | 10–20 |

The mixing ratio may be varied according to the use of the ink, so that the present invention is not intended to be limited to the above ranges.

The advantages in publication gravure inks of this improved solution resinate are improved stability in yellow ink, improved ethyl hydroxy ethyl cellulose (EHEC) compatibility, and improved color development with Phthalo blue and Lithol Rubine pigments.

The following examples are provided to further illustrate the present invention and are not to be construed as limiting the invention in any manner. All parts are parts by weight unless otherwise stated.

EXAMPLE 1

A Diels-Alder adduct was formed by adding to a suitable reaction vessel equipped with an overhead stirrer, condenser and dean stark trap, 1,000 parts of a tall oil rosin. To the rosin wa added 40 parts by weight of maleic anhydride. The inert gas was stopped. The reaction mixture was heated to a temperature of 210° C. and held for one hour to form a complete maleic adduct. The reactor was cooled and 400 parts of toluene was added to form a solubilized rosin adduct.

EXAMPLE 2

A zinc modified resinate to be used as a standard was prepared from the product of Example 1. The solubilized rosin adduct of Example 1 was placed in the reactor and the temperature was adjusted to 98° C. and a slurry of 36 parts zinc metal and 177 parts of toluene were added. After completion of the zinc reaction, the reactor was cooled to 68° C. and a slurry of 82 parts lime (CaOH) and 177 parts toluene was added. The reactants were heated to reflux temperatures and the water of reaction was removed through azeotropic distillation. The properties of this product are shown in Table 1.

EXAMPLE 3

A sodium modified resinate was prepared from the rosin adduct of Example 1. A solubilized rosin adduct made according to Example 1 was placed in a reactor at 98° C., and 10 parts of a 50% aqueous sodium hydroxide solution was added. A slurry of 36 parts zinc and 177 parts of toluene was added. After completion of the zinc reaction, the reactor was then cooled to 68° C. and a slurry of 82 parts lime and 177 parts toluene was added. The reaction was then heated to reflux temperatures and water of reaction was removed through azeotropic distillation. Th physical properties of this product are shown in Table 1.

EXAMPLE 4

A lithium modified resinate was prepared from the resinate of Example 1. A solubilized rosin adduct made according to Example 1 was cooled to 98° C., 15 parts of a 33-1/3% aqueous solution of lithium nitrate solution was added then a slurry of 36 parts zinc and 177 parts of toluene was added. After completion of the zinc reaction, the reactor was then cooled to 68° C. and a slurry of 82 parts lime and 177 parts toluene was added. The reaction was then heated to reflux temperatures and water of reaction was removed through azeotropic distillation. The physical properties of this product are shown in Table 1.

EXAMPLE 5

A sodium modified resinate was prepared from the resinate of Example 1. A solubilized rosin adduct made according to Example 1 was cooled to 98° C., 10 parts of a 50% aqueous sodium nitrate solution was added then a slurry of 36 parts zinc and 177 parts of toluene was added. After completion of the zinc reaction, the reactor was then cooled to 68° C. and a slurry of 82 parts lime and 177 parts toluene was added. The reaction was then heated to reflux temperatures and water of reaction was removed through azeotropic distillation. The physical properties of this product are shown in Table 1.

EXAMPLE 6

A potassium modified resinate was prepared from the resinate of Example 1. A solubilized rosin adduct made according to Example 1 was cooled to 98° C., 10 parts of a 50% aqueous potassium hydroxide solution was added then a slurry of 36 parts zinc and 177 parts of toluene was added. After completion of the zinc reaction, the reactor was then cooled to 68° c. and a slurry of 82 parts lime and 177 parts toluene was added. The reaction was then heated to reflux temperatures and water of reaction was removed through azeotropic distillation. The physical properties of this product are shown in Table 1.

EXAMPLE 7

A lithium modified resinate was prepared from the resinate of Example 1. A solubilized adduct made according to Example 1 was cooled to 98° C., 10 part of a 50% aqueous lithium hydroxide solution was added then a slurry of 36 parts zinc and 177 parts of toluene was added. After completion of the zinc reaction, the reactor was then cooled to 68° C. and a slurry of 82 parts lime and 177 parts toluene was added. The reaction was then heated to reflux temperatures and water of reaction was removed through azeotropic distillation. The physical properties of this product are shown in Table 1.

TABLE 1

| | Physical Properties | | | | | |
|---|---|---|---|---|---|---|
| | Ex. 2 | Ex. 3 | Ex. 4 | Ex. 5 | Ex. 6 | Ex. 7 |
| Modification | standard | NaOH | $LiNO_3$ | $NaNO_3$ | KOH | LiOH |
| Viscosity @ 25° C. (Gardner) | X − Z | Z+ | Y − Z | U − V | Y − Z | Y − Z |
| Color (Gardner) | 16 | 16 | 17 | 14 | 15 | 14 |
| % Non-Volatile | 62.5 | 60.6 | 62 | 61.0 | 61.3 | 61.2 |
| Dilution* | 73 ml | 75 ml | 75 ml | 74 ml | 75 ml | 75 ml |
| Melt Point (°C.) | 173 | 172 | 175 | 170 | 178 | 176 |

*with Toluene, 100 grams to 18" Shell #2

EXAMPLE 8

The solution resinates of Examples 2-7 were tested for ethyl hydroxy ethyl cellulose compatibility. Forty grams of each resinate was mixed with 10 grams of a 7% EHEC solution. The solution was hand stirred, then placed on a Red Devil paint shaker for 15 minutes. After 15 hours the mixtures were examined for EHEC compatibility. The results are listed in Table 2.

TABLE 2

| | Modification | EHEC Compatibility |
|---|---|---|
| Example 2 | Standard | Acceptable (slight haze) |
| Example 3 | NAOH | Excellent (clear) |
| Example 4 | $LiNO_3$ | Excellent (clear) |
| Example 5 | NaNO3 | Excellent (clear) |
| Example 6 | KOH | Excellent (clear) |
| Example 7 | LiOH | Very good (clear) |

The EHEC compatibility of all five resinates prepared using the metal resinate of this invention was better than for the standard resinate prepared without the use of the metals of this invention.

EXAMPLE 9

The solution resinates of Examples 2-7 were tested for yellow pigment stability. Yellow bases inks were prepared using the formula:
resinate: 50 parts
AAA yellow pigment: 25 parts
Toluene: 25 parts The yellow base to letdown was prepared with a press ready ink using the formula:
Grind base (above): 32 parts
resinate: 50 parts
toluene: 18 parts The reduced ink was stored in an oven for 7 days at 110° F. After the 7 days the original base was again letdown using the same letdown formula.

The fresh reduced ink and the aged 7 day ink were drawn down on both supplement stock an coated stock using a #3 draw down rod. The results are listed in Table 3.

TABLE 3

| | Description | Results |
|---|---|---|
| Example 2 | Standard | 7 day old sample was weak and had shifted to a green tint |
| Example 3 | NaOH | No loss of strength or color shift |
| Example 4 | LiNO3 | Very slight loss of strength (better than standard) |
| Example 5 | NaNO3 | Very slight loss of strength (better than standard) |
| Example 6 | KOH | Very slight loss of strength (better than standard) |
| Example 7 | LiOH | Very slight loss of strength (better than standard) |

A Macbeth color meter was used to determine the difference in color change between a standard (no Group 1 metal) resinate and a resinate prepared using sodium hydroxide on both coated and uncoated paper stock. The aged standard resinate shifted to the green side on both coated ad uncoated stock and as significantly weak o the coated stock. The aged sodium modified resinate had very little shift in hue (slightly toward the red side) and was equal on coated stock and darker on uncoated.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

That which is claimed is:

1. A printing ink composition comprising, a vehicle containing a binder dissolved in a hydrocarbon solvent and a pigment dispersed therein, wherein said binder comprises a modified rosin resinate prepared by reacting rosin in a molten state with a dienophile selected from the group consisting of fumaric acid, maleic acid, acrylic acid, methacrylic acid, citraconic acid, itaconic acid, and maleic anhydride to form a rosin adduct, and reacting said rosin adduct with a reactive compound of a metal belonging to Group I of the Periodic Table and a reactive compound of metals selected from the group consisting of zinc, calcium, and mixtures thereof dissolved in a hydrocarbon solvent.

2. The printing ink composition according to claim 1 wherein said rosin is selected from the group consisting of tall oil rosin, gum rosin and wood rosin.

3. The printing ink composition according to claim 1 wherein said reactive compound of metal belonging to Group I of the Periodic Table is a metal salt selected from the group consisting of sodium, potassium and lithium.

4. The printing ink composition according to claim 1 wherein said dienophile is reacted in an amount from about 0.16 to about 1.0 equivalents per equivalent of rosin.

5. The printing ink composition according to claim 4 wherein said dienophile is reacted in an amount from about 0.3 to about 0.6 equivalents per equivalent of rosin.

6. The printing ink composition according to claim 3 wherein said reactive compound of metal belonging to Group I of the Periodic Table is reacted in an amount from about 0.1% to about 5.0% by weight of resinate.

7. The printing ink composition according to claim 1 wherein said reactive compound of metal belonging to Group I of the Periodic Table is reacted in an amount from about 0.2% to about 1.0% by weight of resinate.

8. The printing ink composition according to claim 1 wherein the metal is zinc and is present in an amount from about 2% to about 10% by weight based on the weight of rosin adduct.

9. The printing ink composition according to claim 1 wherein said ink composition is a gravure printing ink composition and comprises from about 3 to about 40 parts by weight of pigment to about 60 to about 97 parts by weight vehicle and up to about 12% by weight reinforcing filler.

10. The printing ink composition according to claim 10 wherein said ink composition comprises from about 10 parts to about 20 parts by weight of pigment to about 80 to 90 parts by weight vehicle and less than about 10% by weight reinforcing filler and wherein said reinforcing filler is ethyl hydroxy ethyl cellulose.

11. A modified solution rosin resinate comprising the reaction product of rosin in a molten state with a dienophile selected from the group consisting of fumaric acid, maleic acid, acrylic acid, methacrylic acid, citraconic acid, itaconic acid, and maleic anhydride to form a rosin adduct and reacting said rosin adduct with a reactive compound of a metal belonging to Group I of the Periodic Table to form a rosin resinate, and said rosin resinate being dissolved in a suitable hydrocarbon solvent and further reacted with a compound selected from the group consisting of zinc, calcium, and mixtures thereof in an amount from about 2% to about 10% by weight based on the weight of the rosin adduct.

12. The rosin resinate according to claim 11 wherein said rosin is selected from the group consisting of tall oil rosin, gum rosin and wood rosin.

13. The rosin resinate according to claim 11 wherein said reactive compound of metal belonging to Group I of the Periodic Table is selected from the group consisting of sodium, potassium and lithium.

14. The rosin resinate according to claim 11 wherein said hydrocarbon solvent is selected from the group consisting of naptha, toluene, and mixtures thereof.

15. The rosin resinate according to claim 11 wherein said hydrocarbon solvent is selected from the group consisting of naptha, and toluene.

16. The rosin resinate according to claim 15 wherein said dienophile is reacted in an amount from about 0.16 to about 1.0 equivalents per equivalent of rosin.

17. The rosin resinate according to claim 16 wherein said dienophile is reacted in an amount from about 0.3 to 0.6 equivalents per equivalent of rosin.

18. The rosin resinate according to claim 11 wherein said reactive compound of metal belonging to Group I of the Periodic Table is reacted in a amount from about 0.1% to about 5% by weight of the resinate.

19. The rosin resinate according to claim 11 wherein said reactive compound of metal belonging to Group I of the Periodic Table is reacted in an amount from about 0.2% to about 1.0% by weight of the resinate.

20. The rosin resinate according to claim 11 wherein the resinate has a melting point greater than 160° C., and a Gardner viscosity of 25° C. of Z.

21. A method for producing rosin resinates particularly suitable as components in printing ink formulations comprising the steps of:
(a) reacting a tall oil rosin in a molten state with from about 0.16 to about 1.0 equivalents per equivalent of rosin of dienophile selected from the group consisting of fumaric acid, maleic acid, acrylic acid, methacrylic acid, citraconic acid, itaconic acid and maleic anhydride for a time sufficient to produce a rosin adduct,
(b) cooling said rosin adduct to from about room temperature to about 100° C. and dissolving said rosin adduct in a hydrocarbon solvent to form a solubilized rosin adduct,
(c) reacting said solubilized rosin adduct with from about 0.1% to about 5.0% by weight of reactive compound of a metal belonging to Group I of the Periodic Table to form a reaction, and
(d) reacting said solubilized rosin with from about 2% to about 10% by weight of zinc.

22. The method according to claim 21 wherein the reaction in step (a) is carried out at a temperature from about 150° C. to 250° C.

23. The method according to claim 21 wherein the reaction in step (a) is carried out at a temperature from about 200° to about 210° C. until the rosin adduct has an acid value of from about 210 to 220.

24. The method according to claim 21 wherein said dienophile is reacted in an amount from about 0.3 to about 0.6 equivalents per equivalent of rosin.

25. The method according to claim 21 wherein the reaction product is dissolved in an hydrocarbon solvent.

26. The method according to claim 25 wherein said hydrocarbon solvent is selected from the group consisting of naptha, toluene, and mixtures thereof.

27. The method according to claim 21 wherein said reactive compound is a Group I metal selected from the group consisting of sodium, potassium and lithium.

28. The method according to claim 21 wherein said reaction product is reacted with from about 0.2% to about 1.0% by weight of reactive compound of a metal selected from Group I of the Periodic Table.

29. In a method of preparing a rosin resinate for use as a vehicle in a printing ink composition comprising forming a rosin adduct by reacting rosin in a molten state with a dienophile selected from the group consisting of fumaric acid, maleic acid, acrylic acid, methacrylic acid, citraconic acid, itaconic acid, and maleic anhydride and reacting said rosin adduct with a member of the group consisting of zinc, calcium, and mixtures thereof, the improvement comprising additionally reacting said rosin adduct with a reactive compound of a metal belonging to Group I of the Periodic Table.

30. The method of claim 29 wherein the rosin is selected from the group consisting of tall oil rosin, gum rosin, and wood rosin.

31. The method of claim 29 wherein the reactive compound of the metal belonging to Group I of the Periodic Table is a metal salt selected from the group consisting of salts of sodium, potassium, and lithium.

32. The method of claim 29 wherein the dienophile is reacted in an amount of from about 0.16 to about 1.0 equivalents per equivalent of rosin.

33. The method of claim 32 wherein the dienophile is reacted in an amount of from about 0.3 to about 0.6 equivalents per equivalent of rosin.

34. The method of claim 29 wherein the reactive compound of the metal belonging to Group I of the Periodic Table is reacted in an amount of from about 0.1% to about 5.0% by weight of the resinate.

35. The method of claim 34 wherein the reactive compound is reacted in an amount of from about 0.2% to about 1.0% by weight of the resinate.

36. The method of claim 34 wherein the member of the group consisting of zinc, calcium, and mixtures thereof is reacted in an amount of from 2% to about 10% by weight based on the weight of the rosin adduct.

37. The method of claim 36 wherein the member of the group consisting of zinc, calcium, and mixtures thereof is reacted in an amount of from about 4% to about 7% by weight based on the weight of the rosin adduct.

38. The method of claim 29 wherein the rosin adduct is reacted with the reactive compound of the metal belonging to Group I of the Periodic Table concurrently with the member of the group consisting of zinc, calcium, and mixtures thereof.

39. The method of claim 29 wherein the rosin adduct is reacted with the reactive compound of the metal belonging to Group I of the Periodic Table prior to subsequent reaction with the member of the group consisting of zinc, calcium, and mixtures thereof.

* * * * *

UNITED STATES PATENT AND TRADEMARK OFFICE
CERTIFICATE OF CORRECTION

PATENT NO.   : 5,082,497
DATED        : January 21, 1992
INVENTOR(S)  : Joseph W. LeVine It is certified that errors appear in the above-identified patent and that said Letters Patent is hereby corrected as shown below:

In column 2, line 14, after in, insert --a--.

In column 2, line 23, after to, delete "with the".

In column 2, line 48, delete "o" and substitute therefor --of--.

In column 2, line 51, delete "use" and substitute therefor --used--.

In column 3, line 1, delete "o" and substitute therefor --or--.

In column 3, line 37, delete "gravur" and substitute therefor --gravure--.

In column 3, line 38, delete "0.%" and substitute therefor --0.1%--.

In column 3, line 45, delete "th" and substitute therefor --the--.

UNITED STATES PATENT AND TRADEMARK OFFICE
CERTIFICATE OF CORRECTION

PATENT NO.   : 5,082,497
DATED        : January 21, 1992
INVENTOR(S)  : Joseph W. LeVine It is certified that errors appear in the above-identified patent and that said Letters Patent is hereby corrected as shown below:

In column 3, line 52, delete "Optionally,".

In column 3, line 52, delete "the" and substitute therefor --The--.

In column 3, line 61, delete "Th" and substitute therefor --The--.

In column 3, line 66, delete "o" and substitute therefor --of--.

In column 4, line 9, before resinate, insert --The amount of--.

In column 4, line 65, delete "wa" and substitute therefor --was--.

In column 5, line 29, delete "Th" and substitute therefor --The--.

UNITED STATES PATENT AND TRADEMARK OFFICE
CERTIFICATE OF CORRECTION

PATENT NO.  : 5,082,497
DATED       : January 21, 1992
INVENTOR(S) : Joseph W. LeVine It is certified that errors appear in the above-identified patent and that said Letters Patent is hereby corrected as shown below:

In Claim 10, column 8, line 37, delete "10" and substitute therefor --9--.

In Claim 36, column 10, line 39, delete "34" and substitute therefor --29--.

Signed and Sealed this

Second Day of November, 1993

*Attest:*

BRUCE LEHMAN

*Attesting Officer*   Commissioner of Patents and Trademarks